United States Patent
Ying et al.

(10) Patent No.: US 11,063,427 B2
(45) Date of Patent: Jul. 13, 2021

(54) DC TRANSMISSION APPARATUS, SURGE CONTROL CIRCUIT AND METHOD

(71) Applicant: DELTA ELECTRONICS (SHANGHAI) CO., LTD., Shanghai (CN)

(72) Inventors: JianPing Ying, Shanghai (CN); Wuying Li, Shanghai (CN); Lifeng Qiao, Shanghai (CN); Teng Liu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 96 days.

(21) Appl. No.: 16/589,814

(22) Filed: Oct. 1, 2019

(65) Prior Publication Data

US 2020/0244065 A1 Jul. 30, 2020

(30) Foreign Application Priority Data

Jan. 24, 2019 (CN) .......................... 201910069032.X

(51) Int. Cl.
 *H02H 9/04* (2006.01)
 *H02H 9/02* (2006.01)

(52) U.S. Cl.
 CPC .............. *H02H 9/025* (2013.01); *H02H 9/04* (2013.01)

(58) Field of Classification Search
 CPC ............ H02H 9/00; H02H 9/008; H02H 9/02; H02H 9/025; H02H 9/04; H02H 9/041;
 (Continued)

(56) References Cited

U.S. PATENT DOCUMENTS 6,556,410 B1 * 4/2003 Manning ................ H02H 9/042
 361/111
7,430,101 B2 * 9/2008 Komulainen ......... H02M 5/458
 361/111

(Continued)

FOREIGN PATENT DOCUMENTS

CN 101202243 A 6/2008
CN 105743058 A 7/2016
 (Continued)

OTHER PUBLICATIONS

Extended European Search Report for EP Application No. 19204797.5, dated Jun. 9, 2020.
 (Continued)

*Primary Examiner* — Thienvu V Tran
*Assistant Examiner* — Shahzeb K Ahmad
(74) *Attorney, Agent, or Firm* — Nixon Peabody LLP; Thomas P. Pavelko

(57) ABSTRACT

Disclosed is a surge control circuit, including: an absorption circuit including an absorption element and a bypass switch which are connected in series, a switch group connected in parallel to both ends of the absorption circuit and a first control circuit electrically connected to the switch group and bypass switch respectively. Normally, the first control circuit controls the switch group and the bypass switch to turn on simultaneously, makes the current flow through the switch group; when detecting the current is greater than or equal to the first preset current value, or the current increase rate is greater than or equal to the preset current rate of change, the first control circuit controls the switch group to turn off, makes the current flow through the absorption circuit; when detecting the current is less than the second preset current value, the first control circuit controls the bypass switch to turn off.

20 Claims, 3 Drawing Sheets

(58) Field of Classification Search
CPC ........ H02H 9/042; H02H 9/043; H02H 7/122; H02H 7/268; H02H 3/20; H02M 1/32; H02M 2001/325; H02M 2007/4835
See application file for complete search history.

(56) References Cited

U.S. PATENT DOCUMENTS

| | | | | |
|---|---|---|---|---|
| 10,439,400 | B2 * | 10/2019 | Barker | H02J 3/36 |
| 10,560,014 | B2 * | 2/2020 | Chivite-Zabalza | H02J 3/36 |
| 2005/0280972 | A1 | 12/2005 | Jonsson | |
| 2012/0250205 | A1 | 10/2012 | Pfitzer et al. | |
| 2015/0116874 | A1 | 4/2015 | Jean Charles et al. | |
| 2015/0131189 | A1 * | 5/2015 | Davidson | H02H 9/044 361/91.5 |
| 2016/0190791 | A1 | 6/2016 | Sim | |
| 2016/0380428 | A1 * | 12/2016 | Barker | H02J 1/06 361/91.2 |
| 2018/0183230 | A1 * | 6/2018 | Kostakis | H02H 3/22 |
| 2020/0152407 | A1 * | 5/2020 | Askan | H01H 71/08 |

FOREIGN PATENT DOCUMENTS

| | | |
|---|---|---|
| CN | 109066608 A | 12/2018 |
| GB | 2542789 A | 4/2017 |
| WO | 2011098145 A1 | 8/2011 |
| WO | WO-2011098145 A1 * | 8/2011 ....... H03K 17/08148 |

OTHER PUBLICATIONS

CN Office Action for Application No. 201910069032.X, dated Apr. 6, 2021.
CN Search Report for Application No. 201910069032.X, dated Apr. 6, 2021.

* cited by examiner

DC TRANSMISSION APPARATUS, SURGE CONTROL CIRCUIT AND METHOD

TECHNICAL FIELD

The present disclosure relates to a technical field of electrical equipment, and more particularly to a Direct-Current (DC) transmission apparatus, a surge control circuit and a method.

BACKGROUND

The surge absorption circuit is widely used in the electrical equipment, for preventing the electrical equipment from be damaged due to impact of transient overvoltage such as lightening stroke or switching overvoltage. Usually, the absorption element of the surge absorption circuit is a nonlinear resistor. When a withstanding voltage of the nonlinear resistor is lower than the maximum continuous operating voltage, a resistance value of the nonlinear resistor is great, and current flowing through the nonlinear resistor is very small. When the withstanding voltage of the nonlinear resistor exceeds the maximum continuous operating voltage, the resistance value of the nonlinear resistor in a protection circuit is dropped rapidly with increase of the withstanding voltage, and current flowing through the nonlinear resistor is increased rapidly, such that the surge current is discharged, to protect the equipment.

For the existing surge absorption circuit, a nonlinear resistance element is usually connected in parallel to both ends of the protected equipment. Due to the characteristics restriction of the nonlinear resistance element itself, the voltage reaching the rated discharge current is considerably higher than the rated voltage thereof. The electrical equipment protected by the surge absorption circuit withstands a fairly high voltage when a surge current arrives, and thereby increasing a requirement of withstanding voltage in design of the equipment.

SUMMARY

In view of this, as for the technical problem that the existing surge absorption circuit increases the requirement of withstanding voltage of the design of the protected equipment in use, it is necessary to provide a DC transmission apparatus, a surge control circuit and method.

A surge control circuit is provided, which includes:

an absorption circuit including an absorption element and a bypass switch, the absorption element and the bypass switch being connected to each other in series;

a switch group connected in parallel to both ends of the absorption circuit; and a first control circuit electrically connected to the switch group and the bypass switch respectively; wherein the first control circuit is configured to detect a current or a current increase rate of the surge control circuit; when normally operating, the first control circuit controls the switch group and the bypass switch to turn on simultaneously, such that the current flows through the switch group; when the first control circuit detects that the current is greater than or equal to a first preset current value, or the current increase rate is greater than or equal to a preset current rate of change, the first control circuit controls the switch group to turn off, such that the current flows through the absorption circuit; when the first control circuit detects that the current is less than a second preset current value, the first control circuit controls the bypass switch to turn off.

In one embodiment, the absorption element includes a varistor; the bypass switch includes an insulated gate bipolar transistor or a metal-oxide semiconductor field-effect transistor.

In one embodiment, the number of the absorption element is one, and the number of the bypass switch is multiple.

In one embodiment, the number of the absorption element is multiple, and the number of the bypass switch is one.

In one embodiment, the surge control circuit further includes:

a protection circuit connected in parallel to both ends of the bypass switch.

In one embodiment, the protection circuit includes:

a voltage-regulator tube, a cathode of the voltage-regulator tube is connected to a first end of the bypass switch, and an anode of the voltage-regulator tube is connected to a second end of the bypass switch.

In one embodiment, the number of the absorption element is multiple, and the number of the bypass switch is multiple.

In one embodiment, the surge control circuit further includes:

a plurality of protection circuits, each of the protection circuits being connected in parallel to both ends of each bypass switch.

In one embodiment, the protection circuit includes:

a voltage-regulator tube, a cathode of the voltage-regulator tube being connected to a first end of the bypass switch, and an anode of the voltage-regulator tube being connected to a second end of the bypass switch.

In one embodiment, the switch group includes:

a plurality of power semiconductor switches which are connected to each other in series.

In one embodiment, the first control circuit includes:

a detector, configured to detect and output the current or the current increase rate; and a first controller in communication connection with the detector, configured to: when normally operating, control the switch group and the bypass switch to turn on simultaneously; compare the current to the first preset current value or compare the current increase rate to the preset current rate of change; and compare the current to the second preset current value; wherein, when the current is greater than or equal to the first preset current value or the current increase rate is greater than or equal to the preset current rate of change, the first controller controls the switch group to turn off; and when the current is less than the second preset current value, the first controller controls the bypass switch to turn off.

In one embodiment, the first control circuit includes:

a signal collecting unit, configured to: detect the current or the current increase rate, compare the current to the first preset current value or compare the current increase rate to the preset current rate of change, and compare the current to the second preset current value; wherein, when the current is greater than or equal to the first preset current value, or the current increase rate is greater than or equal to the preset current rate of change, the signal collecting unit outputs a first turn-off signal; and when the current is less than the second preset current value, the signal collecting unit outputs a second turn-off signal; and a first controller in communication connection with the signal collecting unit, configured to: when normally operating, control the switch group and the bypass switch to turn on simultaneously, control the switch group to turn off according to the first turn-off signal, and control the bypass switch to turn off according to the second turn-off signal.

A surge control method is provided, which is applied to the surge control circuit of any one of the above-mentioned embodiments and includes:

detecting a current or a current increase rate of the surge control circuit, and comparing the current to a first preset current value or compare the current increase rate to a preset current rate of change through a first control circuit (300);

if the current is greater than or equal to the first preset current value, or the current increase rate is greater than or equal to the preset current rate of change, controlling a switch group to turn off through the first control circuit, such that the current flows through an absorption circuit;

comparing the current to a second preset current value;

if the current is less than the second preset current value, controlling a bypass switch to turn off through the first control circuit.

In one embodiment, the surge control method further includes:

before detecting the current or the current increase rate of the surge control circuit, and comparing the current to the first preset current value or compare the current increase rate to the preset current rate of change through the first control circuit, controlling the switch group and the bypass switch to turn on simultaneously through the first control circuit, such that the current flows through the switch group.

In one embodiment, the controlling the switch group to turn off through the first control circuit such that the current flows through an absorption circuit if the current is greater than or equal to the first preset current value, or the current increase rate is greater than or equal to the preset current rate of change, includes:

if the current is greater than or equal to the first current preset value, or the current increase rate is greater than or equal to the preset current rate of change, the first control circuit outputs a first turn-off signal and controls the switch group to turn off according to the first turn-off signal, such that the current flows through the absorption circuit.

In one embodiment, the controlling the bypass switch to turn off through the first control circuit if the current is less than the second preset current value comprises:

if the current is less than the second preset current value, the first control circuit outputs a second turn-off signal and controls the bypass switch to turn off according to the second turn-off signal.

A Direct-Current (DC) transmission apparatus is provided, which includes:

a power supply;

a load electrically coupled to the power supply;

a plurality of switch units electrically connected to the power supply and the load respectively to form a closed loop; wherein, each of the switch units includes an absorption circuit and a switch group, the switch group is connected in parallel to both ends of the absorption circuit; the absorption circuit includes an absorption element and a bypass switch, the absorption element and the bypass switch are connected to each other in series;

a second control circuit electrically connected to the switch group and the bypass switch of each of the switch units; wherein, the second control circuit is configured to detect a current or a current increase rate of the switch unit; when normally operating, the second control circuit controls the switch group and the bypass switch to turn on simultaneously, such that the current flows through the switch group; when the second control circuit detects that the current is greater than or equal to a first preset current value, or the current increase rate is greater than or equal to a preset current rate of change, the second control circuit controls the switch group to turn off, such that the current flows through the absorption circuit; when the second control circuit detects that the current is less than a second preset current value, the second control circuit controls the bypass switch (120) to turn off.

In one embodiment, the second control circuit includes:

a detector configured to detect and output the current or the current increase rate; and a first controller in communication connection with the detector, configured to: when normally operating, control the switch group and the bypass switch to turn on simultaneously; compare the current to the first preset current value or compare the current increase rate to the preset current rate of change; and compare the current to the second preset current value; wherein, when the current is greater than or equal to the first preset current value or the current increase rate is greater than or equal to the preset current rate of change, the first controller controls the switch group to turn off; and when the current is less than the second preset current value, the first controller controls the bypass switch to turn off.

Figure 1:
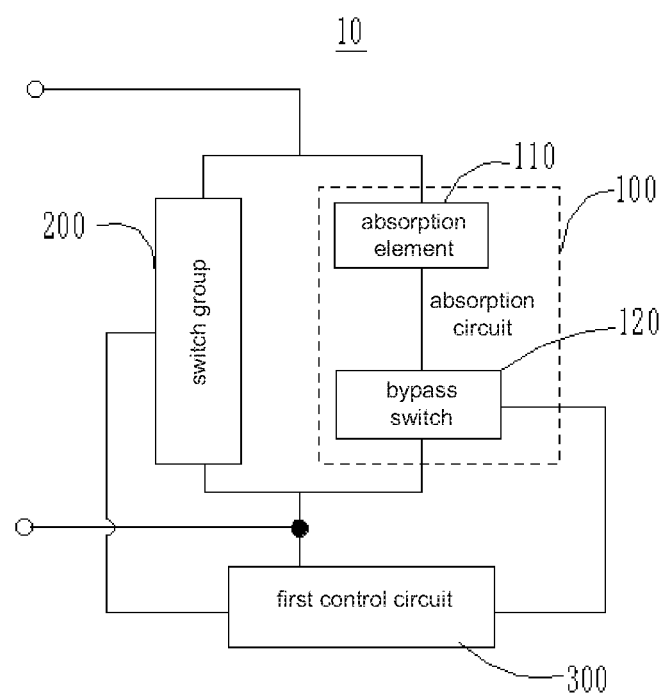
FIG. 1 is a circuit block diagram of a surge control circuit provided by an embodiment of the present disclosure.

ELEMENTS LIST absorption circuit 100; absorption element 110; varistor 111; bypass switch 120; insulated gate bipolar transistor or metal-oxide semiconductor field-effect transistor 121; DC transmission apparatus 20; power supply 21; load 22; switch unit 23; second control circuit 24; switch group 200; a plurality of power semiconductor switches 210; first control circuit 300; detector 310; signal collecting unit 330; production circuit 400; voltage-regulator tube 410.

DETAILED DESCRIPTION OF DISCLOSED EMBODIMENTS

In order to make the above objective, characteristics and advantages clearer and easier to understand, the present disclosure will be detailed hereinafter with reference to the accompanying drawings. The following specific details may facilitate a full understanding of the disclosure. However, the disclosure may be implemented in many different forms and is not limited to the embodiments described herein, those skilled in the art can make similar improvement without violating the connotation of the disclosure. Therefore, the present disclosure is not limited to the following specific embodiments.

It should be noted that when an element is referred to as being "fixed" to another element, the element can be directly on the other element or there may be a mediate element.

When an element is referred to as "coupled" or "connected" to another element, the element can be directly connected to the other element or there may be a mediate element simultaneously.

Unless otherwise defined, all technical and scientific terms used herein have the same meaning as commonly understood by those skilled in the art belonging to the technical field of the disclosure. The terms used in the description of the present disclosure are for the purpose of describing specific embodiments and is not intended to limit the disclosure. The term "and/or" used herein includes any and all combinations of one or more of the associated listed items.

Referring to FIG. 1, an embodiment of the present disclosure provides a surge control circuit 10 which includes an absorption circuit 100, a switch group 200 and a first control circuit 300. The absorption circuit 100 includes an absorption element 110 and a bypass switch 120. The absorption element 110 is connected in series to the bypass switch 120. The switch group 200 is connected in parallel to both ends of the absorption circuit 100. The first control circuit 300 is electrically connected to the switch group 200 and the bypass switch 120 respectively. The first control circuit 300 is configured to detect a current or a current increase rate of the surge control circuit 10.

When normal working, the first control circuit 300 controls the switch group 200 and the bypass switch 120 to turn on simultaneously, such that the current flows through the switch group 200. When the first control circuit 300 detects that the current is greater than or equal to a first preset current value, or the current increase rate is greater than or equal to a preset current rate of change, the first control circuit 300 controls the switch group 200 to turn off, such that the current flows through the absorption circuit 100. When the first control circuit 300 detects that the current is less than a second preset current value, the first control circuit 300 controls the bypass switch 200 to turn off.

It should be appreciated that, the specific structure of the absorption element 110 is not limited, as long as the absorption element 110 has a function that when the applied voltage exceeds the maximum continuous operating voltage, with the increase of the voltage, the value of resistance of the absorption element 110 is dropped rapidly, and the current flowing through the absorption element 110 is increased rapidly. The specific structure of the absorption element 110 can be elected according to actual requirements. In one embodiment, the absorption element 110 may be a metal-oxide varistor (MOV). In one embodiment, the absorption element 110 may also be other nonlinear resistance element, besides the MOV.

It should be appreciated, the number of the absorption element 110 is not limited, as long as guaranteeing that the absorption element 110 has a function that when the applied voltage exceeds the maximum continuous operating voltage, with the increase of the voltage, the value of resistance of the absorption element 110 is dropped rapidly, and the current flowing through the absorption element 110 is increased rapidly. The specific number of the absorption element 110 can be selected according to the actual requirements. In one embodiment, the number of the absorption element 110 may be one. In one embodiment, there may be multiple absorption elements 110.

It should be appreciated that, the specific structure of the bypass switch 210 is not limited, as long as guaranteeing to be able to control on and off of the absorption circuit 100. The specific structure of the bypass switch 120 can be selected according to the actual requirements. In one embodiment, the bypass switch 120 may be an insulated gate bipolar transistor. In one embodiment, the bypass switch 120 may be a metal-oxide semiconductor field-effect transistor.

It should be appreciated that, the specific number of the bypass switch 120 is not limited, as long as guaranteeing to be able to control the absorption circuit 100 to turn on or turn off. The specific number of the bypass switch 120 can be selected according to the actual requirements. In one embodiment, the number of the bypass switch 120 may be one. In one embodiment, there may be multiple bypass switches 120.

In one embodiment, the specific structure of the switch group 200 can be selected according to the actual requirements. In one embodiment, the switch group 200 may consist of multiple metal-oxide semiconductor field-effect transistors in series. In one embodiment, the switch group 200 may also consist of multiple insulated gate bipolar transistors in series. In one embodiment, the switch group 200 may also consist of one metal-oxide semiconductor field-effect transistor and multiple insulated gate bipolar transistors in series. In one embodiment, the switch group 200 may also consist of multiple metal-oxide semiconductor field-effect transistors and one insulated gate bipolar transistor in series. In one embodiment, the switch group 200 may also consist of multiple metal-oxide semiconductor field-effect transistors and multiple insulated gate bipolar transistors in series.

It should be appreciated that, the specific structure of the first control circuit 300 is not limited, as long as being able to detect the current or current increase rate of the surge control circuit 10 and control the switch group 200 and the bypass switch 120 to turn on or turn off. The specific structure of the first control circuit 300 can be selected according to the actual requirements. In one embodiment, the first control circuit 300 may consist of a detector and a controller. In one embodiment, the first control circuit 300 may also consist of a detector and a Micro-programmed Control Unit (MCU).

It should be appreciated that, the specific numerical value of the first preset current value can be set according to the actual requirements. In one embodiment, the sum of the voltage of the bypass switch 120 and the rated voltage of the absorption element 110 is higher than the operating voltage of the switch group 200. When the surge control circuit 10 is operating normally, the switch group 200 and the bypass switch 120 are turned on simultaneously; when the first control circuit 300 detects that the current is greater than or equal to the first preset current value, the switch group 200 can be turned off through the first control circuit 300, such that the current flows through the absorption circuit 100, and the first control circuit 300 does not turn off the bypass switch 120 in the absorption circuit 100 until the current is less than the second preset current value. Through coordination of the first control circuit 300, the absorption circuit 100 and the bypass switch 120, the voltage applied on both ends of the protected equipment or element (i.e., the switch group 200) when a current surge occurs can be effectively reduced, thereby reducing the requirement of withstanding voltage in design of the equipment or element.

It should be appreciated that, the specific numerical value of the preset current rate of change can be set according to the actual requirements. In one embodiment, the sum of the voltage of the bypass switch 120 and the rated voltage of the absorption element 110 is higher than the operating voltage of the switch group 200. When the surge control circuit 10 is in the normal operation, the switch group 200 and the bypass switch 120 are turned on simultaneously. When the first control circuit 300 detects that the current increase rate is greater than or equal to the preset current rate of change, the switch group 200 can be controlled to turn off through the first control circuit 300, such that the current flows through the absorption circuit 100, and the first control circuit 300 does not turn off the bypass switch 120 until the current is less than the second preset current value. Through coordination of the first control circuit 300, the absorption circuit 100 and the bypass switch 120, the voltage applied on both ends of the protected equipment or element (i.e., the switch group 200) when a current surge occurs can be effectively reduced, and thereby reducing the requirement of withstanding voltage in design of the equipment or element.

In the embodiment, the absorption element 110 is connected in series to the bypass switch 120. Through the coordination of the first control circuit 300 and the absorption circuit 100 consisting of the absorption element 110 and the bypass switch 120, a clamp voltage of the absorption circuit 100 when adjusting the current surge can be reduced, and thereby reducing the requirement of withstanding voltage of design of the switch group 200 and the loss.

Figure 2:
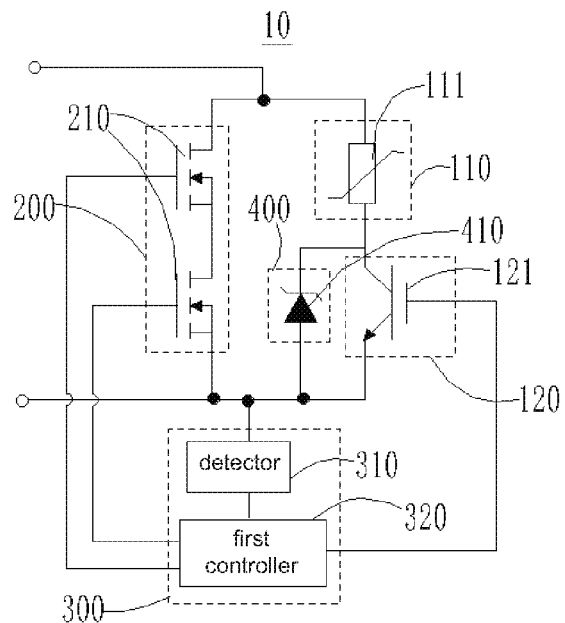
FIG. 2 is a circuit structure schematic diagram I of a surge control circuit provided by an embodiment of the present disclosure.

Referring to FIG. 2, in one embodiment, the absorption element 110 includes a varistor 111. The bypass switch 120 includes an insulated gate bipolar transistor or metal-oxide semiconductor field-effect transistor 121. In one embodiment, the varistor 111 may be a MOV. In one embodiment, the varistor 111 may be a titanium oxide varistor. By utilizing the restriction of volt-ampere characteristics of the varistor 111 in conjunction with the insulated gate bipolar transistor or metal-oxide semiconductor field-effect transistor, the voltage applied on both ends of the protected equipment or element (i.e., the switch group 200) when a current surge occurs can be effectively reduced, and thereby reducing the requirement of withstanding voltage in design of the equipment or element.

In one embodiment, the number of the absorption element 110 may be one, and the number of the bypass switches 120 is multiple. In one embodiment, the number of the absorption elements 110 may also be multiple, and the number of the bypass switch 120 may be one. In one embodiment, the number of the absorption element 110 may be multiple, and the number of the bypass switch 120 may also be multiple. The specific number of the absorption element 110 and the bypass switch 120 can be set according to the actual requirements.

In one embodiment, the surge control circuit 10 further includes a protection circuit 400. The protection circuit 400 is connected in parallel to both ends of the bypass switch 120. It should be appreciated that, the specific structure of the protection circuit 400 is not limited, which has a function of not only protecting the bypass switch 120 in order to prevent the bypass switch 120 from damaging, but also statically ensuring that the voltage applied on both ends of the bypass switch 120 does not exceeds a voltage range withstood by a device by using the voltage clamp characteristics of the protection circuit 400, thereby implementing a reasonable distribution of voltage of the bypass switch 120 and voltage of the absorption element 110, and reducing the design voltage of the bypass switch 120. In one embodiment, the protection circuit 400 may consist of a voltage-regulator tube 410.

Specifically, the cathode of the voltage-regulator tube 410 is connected to the first end of the bypass switch 120, and the anode of the voltage-regulator tube 410 is connected to the second end of the bypass switch 120, i.e., the voltage-regulator tube 410 is connected in parallel to both ends of the bypass switch 120. In the case of the bypass switch 120 turned off, it is ensured that the voltage of the bypass switch 120 does not exceed a preset value. Through such connecting structure, the designed withstanding voltage of the bypass switch 120 can be reduced and thereby reducing the cost of the bypass switch 120. In one embodiment, the protection circuit 400 may also consist of a Transient Voltage Suppressor (TVS) diode or a Zener diode.

In one embodiment, the number of the protection circuit 400 is not limited, may be one or multiple. In one embodiment, when the number of the protection circuit 400 is multiple, one protection circuit 400 may be connected in parallel to both ends of each bypass switch 120. When the number of the protection circuit 400 is one, the protection circuit 400 may be connected in parallel to both ends of the bypass switch 120. In one embodiment, the structure described in the above-mentioned embodiment may be adopted as the specific structure of the protection circuit 400, not repeated here. In one embodiment, by connecting the protection circuit 400 in parallel to both ends of the bypass switch 120, the designed withstanding voltage of the bypass switch 120 can be reduced and then the cost of the bypass switch 120 is reduced.

In one embodiment, the switch group 200 includes multiple power semiconductor switches 210. The multiple power semiconductor switches 210 are connected to each other in series. In one embodiment, the power semiconductor switch 210 may be a metal-oxide semiconductor field-effect transistor. In one embodiment, the power semiconductor switch 210 may also be an insulated gate bipolar transistor.

In one embodiment, the first control circuit 300 includes a detector 310 and a first controller 320. The detector 310 is configured to detect and output the current or current increase rate. The first controller 320 is in communication connection with the detector 310. When normally operating, the first controller 320 is configured to control the switch group 200 and the bypass switch 120 to turn on simultaneously. The first controller 320 compares the current to the first preset current value, or compares the current increase rate to the preset current rate of change. When the current is greater than or equal to the first preset current value, or the current increase rate is greater than or equal to the preset current rate of change, the first controller 320 controls the switch group 100 to turn off. The first controller 320 compares the current to the second preset current value, when the current is less than the second preset current value, the first controller 320 controls the bypass switch 120 to turn off.

It should be appreciated that, the mode of communication connection between the first controller 320 and the detector 310 is not limited, as long as guaranteeing a communication between the first controller 320 and the detector 310. The specific communication mode between the first controller 320 and the detector 310 can be selected according to the actual requirements. In one embodiment, the first controller 320 can communicate with the detector 310 through a radio-frequency signal. In one embodiment, the first controller 320 can also communicate with the detector 310 through a Bluetooth or WIFI.

In one embodiment, the step of comparing the current to the first preset current value through the first controller 320 refers to that: a difference comparison is performed between the current and the first preset current value through the first controller 320 to obtain a difference, if the difference is greater than or equal to zero, it means that the current is greater than or equal to the first preset current value, at this moment the switch group 200 can be controlled to turn off through the first controller 320. In one embodiment, a quotient comparison may also be performed between the current and the first preset current value. In other words, the mode of comparison between the current and the first preset current value is not limited, but can be selected according to the actual requirements.

In one embodiment, the step of comparing the current increase rate to the preset current rate of change through the first controller 320 refers to that: a difference is performed between the current increase rate and the preset current rate of change through the first controller 320 to obtain a difference, if the difference is greater than or equal to zero, it means that the current increase rate is greater than or equal to the preset current rate of change, at this moment the switch group 100 can be controlled to turn off through the first controller 320. In one embodiment, a quotient comparison may also be performed between the current increase rate and the preset current rate of change. In other words, the mode of comparison between the current increase rate and the preset current rate of change is not limited, but can be selected according to the actual requirements.

In one embodiment, the mode of comparison between the current and the second preset current value can also adopt the mode described in the above-mentioned embodiment, not repeated here. In one embodiment, when the current is less than the second preset current value, the bypass switch 120 can be controlled to turn off through the first controller 320. Through the coordination of the first controller 320 and the detector 310, turn-off of the switch group 200 and the bypass switch 120 can be controlled in time, and the damage to the switch group 200 can be effectively avoided.

Figure 3:
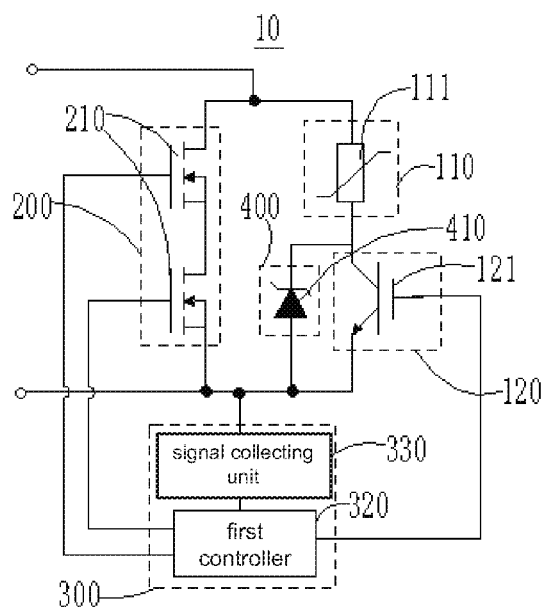
FIG. 3 is a circuit structure schematic diagram II of a surge control circuit provided by an embodiment of the present disclosure.

Referring to FIG. 3, in one embodiment, the first controller circuit 300 includes a signal collecting unit 330 and a first controller 320. The signal collecting unit 330 is configured to detect the current or the current increase rate, compare the current to the first preset current value or compare the current increase rate to the preset current rate of change, and compare the current to the second preset current value. When the current is greater than or equal to the first preset current value, or the current increase rate is greater than or equal to the preset current rate of change, the signal collecting unit 330 outputs a first turn-off signal. And when the current is less than the second preset current value, the signal collecting unit 330 outputs a second turn-off signal.

The first controller 320 is in communication connection with the signal collecting unit 330. When normally operating, the first controller 320 is configured to control the switch group 200 and the bypass switch 120 to turn on simultaneously. The first controller 320 controls the switch group 200 to turn off according to the first turn-off signal. The controller 320 controls the bypass switch 120 to turn off according to the second turn-off signal.

In one embodiment, the step that the signal collecting unit 330 is configured to compare the current to the first current preset value refers to that: a difference comparison is performed between the current and the first preset current value through the signal collecting unit 330 to obtain a difference, if the difference is greater than or equal to zero, it means that the current is greater than or equal to the first preset current value, at this moment a turn-off signal can be output through the signal collecting unit 330. In one embodiment, a quotient comparison may also be performed between the current and the first preset current value. In other words, the mode of comparison between the current and the first preset current value is not limited, but can be selected according to the actual requirements.

In one embodiment, the step that the signal collecting unit 330 is configured to compare the current increase rate to the preset current rate of change refers to that: a difference comparison is performed between the current increase rate and the preset current rate of change through the signal collecting unit 330 to obtain a difference, if the difference is greater than or equal to zero, it means that the current increase rate is greater than or equal to the preset current rate of change, at this moment the first turn-off signal can be output through the signal collecting unit 330. In one embodiment, a quotient comparison may also be performed between the current increase rate and the preset current rate of change. In other words, the mode of comparison between the current increase rate and the preset current rate of change is not limited, but can be selected according to the actual requirements.

In one embodiment, the mode of comparison between the current and the second preset current value can also adopt the mode described in the above-mentioned embodiment, not repeated here. In one embodiment, when the current is less than the second preset current value, a second turn-off signal can be output through the signal collecting unit 330.

It should be appreciated that, the mode of communication connection between the first controller 320 and the signal collecting unit 330 is not limited, as long as guaranteeing a communication between the first controller 320 and the signal collecting unit 330. The specific communication mode between the first controller 320 and the signal collecting unit 330 can be selected according to the actual requirements. In one embodiment, the first controller 320 can communicate with the signal collecting unit 330 through a radio-frequency signal. In one embodiment, the first controller 320 can also communicate with the signal collecting unit 330 through a Bluetooth or WIFI.

In one embodiment, the first controller 320 receives the first turn-off signal and the second turn-off signal sent by the signal collecting unit 330. In one embodiment, the first controller 320 controls the switch group 200 to turn off according to the first turn-off signal. In one embodiment, the first controller 320 controls the bypass switch 120 to turn off according to the second turn-off signal. Through the coordination of the first controller 320 and the signal collecting unit 330, turn-off of the switch group 200 and the bypass switch 120 can be controlled in time, and damage to the switch group 200 can be effectively avoided.

Figure 4:
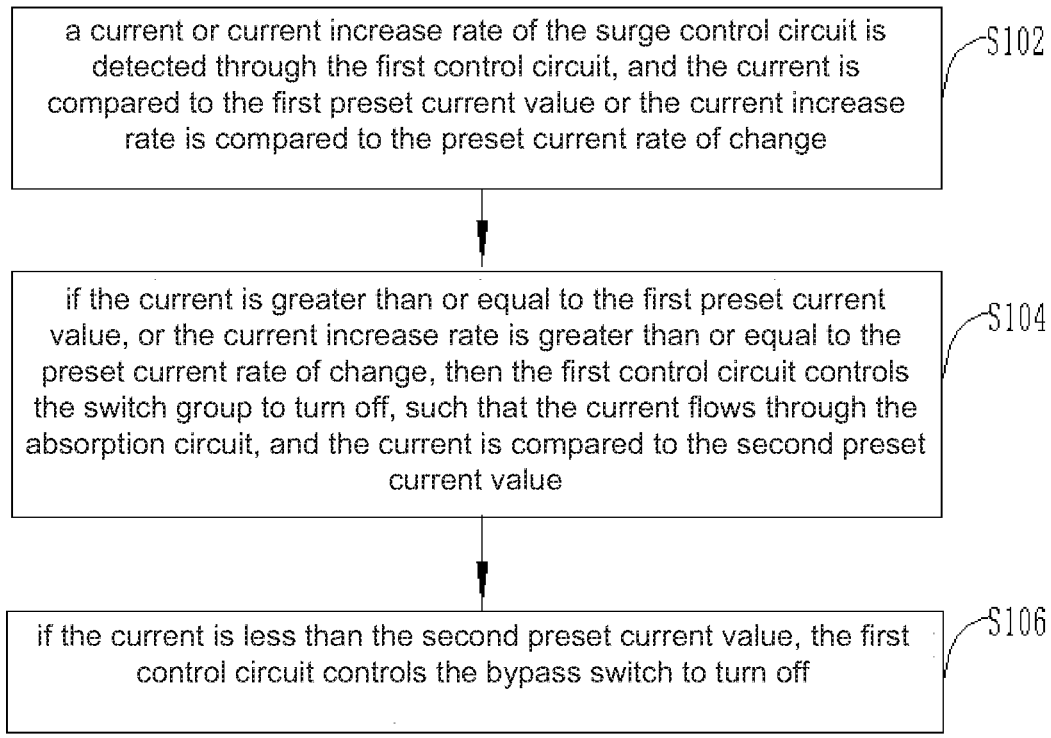
FIG. 4 is a flow chart of a surge control method provided by an embodiment of the present disclosure.

Referring to FIG. 4, an embodiment of the present disclosure provides a surge control method, applied to the surge control circuit 10 of any one of the above-mentioned embodiments. The control method includes the following steps.

At S102, a current or current increase rate of the surge control circuit 10 is detected through the first control circuit 300, and the current is compared to the first preset current value or the current increase rate is compared to the preset current rate of change.

In one embodiment, the specific structure of the first control circuit 300 can adopt the structure described in the above-mentioned embodiments, not repeated here. In one embodiment, the step of comparing the current to the first preset current value through the first control circuit 300 refers to that: a difference comparison is performed between the current and the first preset current value through the first control circuit 300 to obtain a difference. In one embodiment, a quotient comparison may also be performed between the current and the first preset current value. In other words, the mode of comparison between the current and the first current preset value is not limited, but can be selected according to the actual requirements.

In one embodiment, the step of comparing the current increase rate to the preset current rate of change refers to that: a difference comparison is performed between the current increase rate and the preset current rate of change through the first control circuit 300 to obtain a difference. In one embodiment, a quotient comparison may also be performed between the current increase rate and the preset current rate of change. In other words, the mode of comparison between the current increase rate and the preset current rate of change is not limited, but can be selected according to the actual requirements.

At S104, if the current is greater than or equal to the first preset current value, or the current increase rate is greater than or equal to the preset current rate of change, then the first control circuit 300 controls the switch group 200 to turn off, such that the current flows through the absorption circuit 100, and the current is compared to the second preset current value.

In one embodiment, the first control circuit 300 controls the switch group 200 to turn off only when the current is greater than or equal to the first preset current value, or the current increase rate is greater than or equal to the preset current rate of change, such that the current flows through the absorption circuit 100. In one embodiment, the mode of comparison between the current and the second preset current value can adopt the mode described in the above-mentioned embodiments, i.e., a difference comparison or a quotient comparison, not repeated here.

At S106, if the current is less than the second preset current value, the first control circuit 300 controls the bypass switch 120 to turn off.

In one embodiment, when the current is less than the second preset current value, i.e., the current in the absorption circuit 100 is in a safe range, the first control circuit 300 controls the bypass switch 120 to turn off, so as to avoid damage to the switch group 200.

In one embodiment, the control method further includes: before the step S102, the switch group 200 and the bypass switch 120 are controlled to turn on simultaneously through the first control circuit 300, such that the current flows through the switch group 200. In one embodiment, the structures of the switch group 200 and the bypass switch 120 can adopt the structures described in the above-mentioned embodiments.

In one embodiment, the step that the first control circuit 300 controls the switch group 200 to turn off when the current is greater than or equal to the first preset current value, or the current increase rate is greater than or equal to the preset current rate of change, such that the current flows through the absorption circuit 100 includes: if the current is greater than or equal to the first preset current value, or the current increase rate is greater than or equal to the preset current rate of change, the first control circuit 300 outputs a first turn-off signal, and controls the switch group 200 to turn off according to the first turn-off signal, such that the first current flows through the absorption circuit 100.

In one embodiment, when the current is greater than or equal to the first preset current value, the first control circuit 300 outputs a first turn-off signal, and controls the switch group 200 to turn off according to the first turn-off signal, such that the first current flows through the absorption circuit 100. In one embodiment, when the current increase rate is greater than or equal to the preset current rate of change, the first control circuit 300 also outputs a first turn-off signal, and controls the switch group 200 to turn off according to the first turn-off signal, such that the first current flows through the absorption circuit 100.

In one embodiment, the step that the first control circuit 300 controls the bypass switch 120 to turn off when the current is less than the second current preset value includes: if the current is less than the second preset current value, the first control circuit 300 outputs a second turn-off signal, and controls the bypass switch 120 to turn off according to the second turn-off signal.

In one embodiment, when the current is less than the second preset current value, which means that at this moment the current in the absorption circuit 100 is in the safe range, the second turn-off signal can be outputted through the first control circuit 300, and the bypass switch 120 can be controlled to turn off according to the second turn-off signal.

Figure 5:
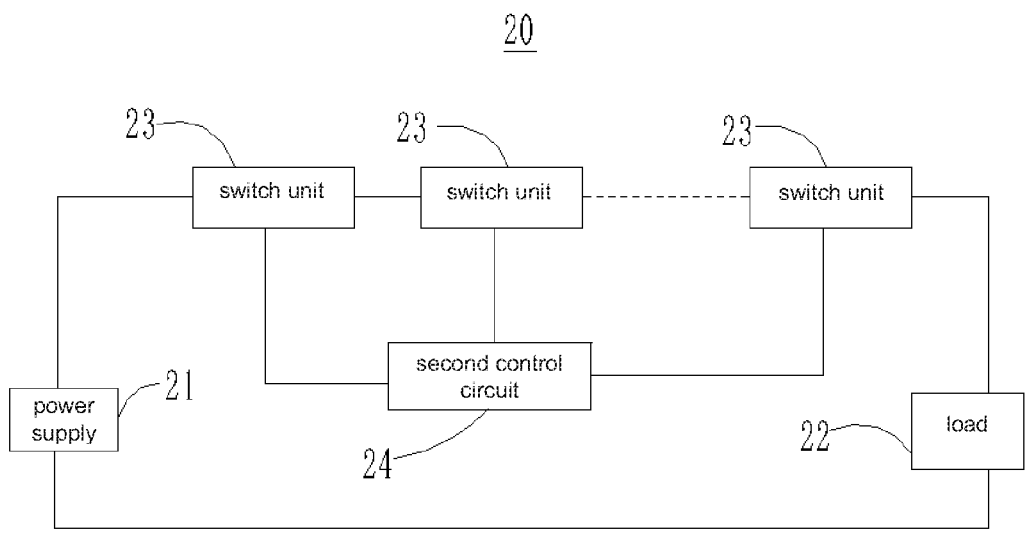
FIG. 5 is a circuit block diagram of a DC transmission apparatus provided by an embodiment of the present disclosure.

Referring to FIG. 5, an embodiment of the present disclosure provides a Direct-Current (DC) transmission apparatus, which includes a power supply 21, a load 22, a plurality of switch units 23 in series and a second control circuit 24. The load 22 is electrically coupled to the power supply 21. The plurality of the switch units 23 are electrically connected to the power supply 21 and the load 22 respectively, thereby forming a closed loop. Wherein, the switch unit 23 includes an absorption circuit 100 and a switch group 200. The switch group 200 is connected in parallel to both ends of the absorption circuit 100. The absorption circuit 100 includes an absorption element 110 and a bypass switch 120. The absorption element 110 and the bypass switch 120 are connected to each other in series.

The second control circuit 24 is electrically connected to the switch group 200 and the bypass switch 120 of each the switch unit 23. The second control circuit 24 is configured to detect the current or current increase rate of the switch unit 23. When normally operating, the second control circuit 24 controls the switch group 200 and the bypass switch 120 to turn on simultaneously, such that the current flows through the switch group 200. When the current detected by the second control circuit 24 is greater than or equal to the first preset current value, or the current increase rate is greater than or equal to the preset current rate of change, the second control circuit 24 controls the switch group 200 to turn off, such that the current flows through the absorption circuit 100. When the second control circuit 24 detects that the current is less than the second preset current value, the second control circuit 24 controls the bypass switch 120 to turn off.

In one embodiment, the specific structures of the absorption element 110, the bypass switch 120 and the switch group 200 can adopt the structures described in the above-mentioned embodiments. In one embodiment, the power supply 21 can adopt a conventional power supply, such as an accumulator, commercial power and so on.

In one embodiment, the second control circuit 24 compares the detected current to the current preset value to obtain a difference, if the difference is greater than or equal to zero, it means the current is greater than or equal to the first preset current value, at this moment the switch group 200 can be controlled to turn off through the second control circuit 24, such that the current flows through the absorption circuit 100. In one embodiment, a quotient comparison can also be performed between the current and the first preset current value. In other words, the mode of comparison between the current and the first preset current value is not limited, but can be selected according to the actual requirements.

In one embodiment, the second control circuit 24 compares the detected current increase rate to the preset current rate of change to obtain a difference, if the difference is greater than or equal to zero, it means that the current increase rate is greater than or equal to the preset current rate of change, at this moment the switch group 200 can be controlled to turn off through the second control circuit 24, such that the current flows through the absorption circuit 100. In one embodiment, a quotient comparison can also be performed between the current increase rate and the preset current rate of change. In other words, the mode of comparison between the current increase rate and the preset current rate of change is not limited, but can be selected according to the actual requirements.

In one embodiment, the mode of comparison between the current and the second preset current value performed by the second control circuit 24 can adopt the above mode described in the above-mentioned embodiments. In one embodiment, when the current is less than the second preset current value, the second control circuit 24 controls the bypass switch 120 to turn off. The switch group 200 and the bypass switch 120 can be controlled to turn off in time through the second control circuit 24, thus the damage to the switch group 200 can be effectively avoided.

In one embodiment, the specific structure of the second control circuit 24 can adopt the same structure as the first control circuit 300. In one embodiment, the second control circuit 24 may include a detector 310 and a first controller 320. In one embodiment, the second control circuit 24 may also include a signal collecting unit 330 and a first controller 320.

From the above, in the present disclosure, the absorption element 110 is connected in series to the bypass switch 120, by utilizing the coordination of the first control circuit 300 and the absorption circuit 100 consisting of the absorption element 110 and the bypass switch 120, a clamp voltage of the absorption circuit 100 when adjusting the current surge can be reduced, and thereby reducing the requirement of withstanding voltage of design of the switch group 200 and the loss.

Various technical features of the above embodiments can be combined discretionarily. In order to make the description concise, not all possible combinations of the various technical features in the above-mentioned embodiments are illustrated here. However, the combinations of these technical features, as long as no contradiction, should be considered to be within the scope of the disclosure.

The above-mentioned embodiments are merely illustrative of several embodiments of the present disclosure, and the description thereof is more specific and detailed, but is not understood as limiting the scope of the disclosure. It should be noted that a number of variations and modifications may be made by those skilled in the art without departing from the spirit of the disclosure, and these variations and modifications also belong to the scope of the disclosure. Therefore, the scope of the disclosure should be subject to the appended claims.

What is claimed is:

1. A surge control circuit (10), comprising:
    an absorption circuit (100) comprising an absorption element (110) and a bypass switch (120), the absorption element (110) and the bypass switch (120) being connected to each other in series;
    a switch group (200) connected in parallel to both ends of the absorption circuit (100); and
    a first control circuit (300) electrically connected to the switch group (200) and the bypass switch (120) respectively;
    wherein the first control circuit (300) is configured to detect a current or a current increase rate of the surge control circuit (10); when the surge control circuit is normally operating, the first control circuit (300) controls the switch group (200) and the bypass switch (120) to turn on simultaneously, such that the current flows through the switch group (200); when the first control circuit (300) detects that the current is greater than or equal to a first preset current value, or the current increase rate is greater than or equal to a preset current rate of change, the first control circuit (300) controls the switch group (200) to turn off, such that the current flows through the absorption circuit (100); when the first control circuit (300) detects that the current is less than a second preset current value, the first control circuit (300) controls the bypass switch (120) to turn off.

2. The surge control circuit according to claim 1, wherein, the absorption element (110) comprises a varistor (111); the bypass switch (120) comprises an insulated gate bipolar transistor or a metal-oxide semiconductor field-effect transistor (121).

3. The surge control circuit according to claim 1, wherein, the number of the absorption element (110) is one, and the number of the bypass switch (120) is multiple.

4. The surge control circuit according to claim 3, further comprising:
    a plurality of protection circuits (400), each of the protection circuits (400) being connected in parallel to both ends of each bypass switch (120).

5. The surge control circuit according to claim 4, wherein, the protection circuit (400) comprises:
    a voltage-regulator tube (410), a cathode of the voltage-regulator tube (410) is connected to a first end of the bypass switch (120), and an anode of the voltage-regulator tube (410) is connected to a second end of the bypass switch (120).

6. The surge control circuit according to claim 1, wherein, the number of the absorption element (110) is multiple, and the number of the bypass switch (120) is one.

7. The surge control circuit according to claim 6, further comprising:
    a protection circuit (400) connected in parallel to both ends of the bypass switch (120).

8. The surge control circuit according to claim 7, wherein, the protection circuit (400) comprises:
    a voltage-regulator tube (410), a cathode of the voltage-regulator tube (410) is connected to a first end of the bypass switch (120), and an anode of the voltage-regulator tube (410) is connected to a second end of the bypass switch (120).

9. The surge control circuit according to claim 1, wherein, the number of the absorption element (110) is multiple, and the number of the bypass switch (120) is multiple.

10. The surge control circuit according to claim 9, further comprising:
    a plurality of protection circuits (400), each of the protection circuits (400) being connected in parallel to both ends of each bypass switch (120).

11. The surge control circuit according to claim 10, wherein, the protection circuit (400) comprises:
    a voltage-regulator tube (410), a cathode of the voltage-regulator tube (410) is connected to a first end of the bypass switch (120), and an anode of the voltage-regulator tube (410) is connected to a second end of the bypass switch (120).

12. The surge control circuit according to claim 1, wherein, the switch group (200) comprises:
   a plurality of power semiconductor switches (210) which are connected to each other in series.

13. The surge control circuit according to claim 1, wherein, the first control circuit (300) comprises:
   a detector (310), configured to detect and output the current or the current increase rate; and
   a first controller (320) in communication connection with the detector (310), configured to: when the surge control circuit is normally operating, control the switch group (200) and the bypass switch (120) to turn on simultaneously; compare the current to the first preset current value or compare the current increase rate to the preset current rate of change; and compare the current to the second preset current value;
   wherein, when the current is greater than or equal to the first preset current value or the current increase rate is greater than or equal to the preset current rate of change, the first controller (320) controls the switch group (100) to turn off; and when the current is less than the second preset current value, the first controller (320) controls the bypass switch (300) to turn off.

14. The surge control circuit according to claim 1, wherein, the first control circuit (300) comprises:
   a signal collecting unit (330), configured to: detect the current or the current increase rate, compare the current to the first preset current value or compare the current increase rate to the preset current rate of change, and compare the current to the second preset current value; wherein, when the current is greater than or equal to the first preset current value, or the current increase rate is greater than or equal to the preset current rate of change, the signal collecting unit (330) outputs a first turn-off signal; and when the current is less than the second preset current value, the signal collecting unit (330) outputs a second turn-off signal; and
   a first controller (320) in communication connection with the signal collecting unit (330), configured to: when the surge control circuit is normally operating, control the switch group (200) and the bypass switch (120) to turn on simultaneously, control the switch group (200) to turn off according to the first turn-off signal, and control the bypass switch (120) to turn off according to the second turn-off signal.

15. A surge control method, applied to the surge control circuit (10) of claim 1, comprising: detecting the current or the current increase rate of the surge control circuit (10), and comparing the current to the first preset current value or compare the current increase rate to the preset current rate of change through the first control circuit (300); if the current is greater than or equal to the first preset current value, or the current increase rate is greater than or equal to the preset current rate of change, controlling the switch group (200) to turn off through the first control circuit (300), such that the current flows through the absorption circuit (100); comparing the current to the second preset current value; if the current is less than the second preset current value, controlling the bypass switch (120) to turn off through the first control circuit (300).

16. The surge control method according to claim 13, further comprising:
   before detecting the current or the current increase rate of the surge control circuit (10), and comparing the current to the first preset current value or compare the current increase rate to the preset current rate of change through the first control circuit (300),
   controlling the switch group (200) and the bypass switch (120) to turn on simultaneously through the first control circuit (300), such that the current flows through the switch group (200).

17. The surge control method according to claim 13, wherein, the controlling the switch group (200) to turn off through the first control circuit (300) such that the current flows through an absorption circuit (100) if the current is greater than or equal to the first preset current value, or the current increase rate is greater than or equal to the preset current rate of change, comprises:
   if the current is greater than or equal to the first preset current value, or the current increase rate is greater than or equal to the preset current rate of change, the first control circuit (300) outputs a first turn-off signal and controls the switch group (200) to turn off according to the first turn-off signal, such that the current flows through the absorption circuit (100).

18. The surge control method according to claim 17, wherein, the controlling the bypass switch (120) to turn off through the first control circuit (300) if the current is less than the second preset current value comprises:
   if the current is less than the second preset current value, the first control circuit (300) outputs a second turn-off signal and controls the bypass switch (120) to turn off according to the second turn-off signal.

19. A Direct-Current (DC) transmission apparatus, comprising:
   a power supply (21);
   a load (22) electrically coupled to the power supply (21);
   a plurality of switch units (23) electrically connected to the power supply (21) and the load (22) respectively to form a closed loop; wherein, each of the switch units (23) comprises an absorption circuit (100) and a switch group (200), the switch group (200) is connected in parallel to both ends of the absorption circuit (100); the absorption circuit (100) comprises an absorption element (110) and a bypass switch (120), the absorption element (110) and the bypass switch (120) are connected to each other in series;
   a second control circuit (24) electrically connected to the switch group (200) and the bypass switch (120) of each of the switch units (23); wherein, the second control circuit (24) is configured to detect a current or a current increase rate of the switch unit (23); when the DC transmission apparatus is normally operating, the second control circuit (24) controls the switch group (200) and the bypass switch (120) to turn on simultaneously, such that the current flows through the switch group (200); when the second control circuit (24) detects that the current is greater than or equal to a first preset current value, or the current increase rate is greater than or equal to a preset current rate of change, the second control circuit (24) controls the switch group (200) to turn off, such that the current flows through the absorption circuit (100); when the second control circuit (24) detects that the current is less than a second preset current value, the second control circuit (24) controls the bypass switch (120) to turn off.

20. The DC transmission apparatus according to claim 19, wherein, the second control circuit (24) comprises:
   a detector (310) configured to detect and output the current or the current increase rate; and a first controller (320) in communication connection with the detector (310), configured to: when the DC transmission apparatus is normally operating, control the switch group (200) and the bypass switch (120) to turn on simultaneously; compare the current to the first preset current value or compare the current increase rate to the preset current rate of change; and compare the current to the second preset current value; wherein, when the current is greater than or equal to the first preset current value or the current increase rate is greater than or equal to the preset current rate of change, the first controller (320) controls the switch group (100) to turn off; and when the current is less than the second preset current value, the first controller (320) controls the bypass switch (300) to turn off.

* * * * *